Patented July 14, 1942

2,289,461

UNITED STATES PATENT OFFICE 2,289,461

DISCHARGEABLE DYESTUFF

Victor S. Salvin, George C. Ward, and George W. Seymour, Cumberland, Md., assignors to Celanese Corporation of America, a corporation of Delaware No Drawing. Application February 13, 1940, Serial No. 318,702

2 Claims. (Cl. 8—64)

This invention relates to the discharge printing of organic derivatives of cellulose wherein pure white and illuminated discharges are obtainable on deeply colored backgrounds such as navy blue, black and deep brown.

An object of this invention is the manufacture of dischargeable amino-azo dyestuffs and the production therefrom of further diazotized and similarly dischargeable dyestuffs, all of which are especially suitable for the dyeing of organic derivatives of cellulose.

A further object of this invention is the use of azo dyestuffs whose discharge products are easily removed from the fabric thus permitting full and complete discharge.

Another object of this invention is the production of discharge pastes for discharging the azo dyed material in a desired pattern, which pastes are particularly suitable for use in connection with the above mentioned azo dyes where pure white or illuminated discharges are desired.

According to the present invention materials comprising organic derivatives of cellulose are colored in deep shades by first dyeing the same with dischargeable amino-azo dyestuffs and then further diazotizing the latter to form similarly dischargeable polyazo dyestuffs on the material. The dyed cellulose derivative materials are then treated with the novel discharge pastes of the present invention which comprise an alkali metal thiocyanate, a metal sulfoxylate formaldehyde and a suitable penetrant to produce a pure white discharge. While a penetrant may be used its inclusion in the paste is not essential. Where an illuminated discharge is desired, the discharge paste will also contain a dyestuff which is either resistant to reduction and is itself a dye for the cellulose derivative, or else contains one which can be reversibly oxidized after being vatted to the leuco form.

The development of a series of satisfactorily dischargeable dyestuffs depends essentially on the type of reduction products the dyestuffs will yield upon discharge, and upon the effect these discharge products have on cellulose derivatives. We have now determined that dischargeable dyestuffs suitable for the coloration of materials containing organic derivatives of cellulose such as cellulose acetate in dark shades should contain at least one azo linkage but said dyestuffs preferably contain a plurality of azo linkages. When the dyestuff is discharged these azo linkages are split, with the resultant formation of by-products. If the fabric is to be discharged to white, these resulting products must be fairly easily removable by water and preferably water-soluble, colorless, and have very little affinity for the organic derivative of cellulose material. It is preferable that these discharge products be removed from the white discharge as nearly completely as possible, otherwise the whites will not remain permanently white but will oxidize slowly in the air to browns and dirty whites, particularly when the fabric is exposed to sunlight.

The amino-azo compounds suitable in our process are aryl-azo anilines containing acidylamino groups in the aniline nucleus. The compounds may be represented generically by the following formula

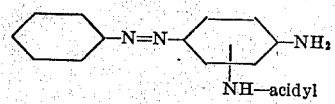

Both benzene nuclei may be further substituted by additional groups to vary the color and solubility characteristics of the resulting diazo compounds. These amino-azo compounds are of particular value for conversion into other azo dyes and the various modifications to which these compounds may be subjected are hereinafter set out.

While diazotization and coupling may be carried out to give the dyestuff in substance, it is of especial advantage to couple on the cellulose derivative material itself. This is done by first basing the fabric with the mono-azo-aniline dye and then diazotizing the dyed fabric and coupling to form a disazo compound.

When the disazo compound is formed by coupling on the fabric in this manner it is possible to produce a series of valuable dyeings and most particularly it is possible to produce dyeings of very desirable greenish navy blue shades which, besides being dischargeable, also have very good fastness to light and washing. The invention contemplates the use of both the aryl-azo anilines containing acidyl-amino groups in the aniline nuclei, and the azo dyes obtainable by diazotizing the aryl-azo anilines and coupling them with additional coupling components as described.

The invention more particularly includes processes for the utilization of the above mentioned dyestuffs in the preparation of cellulose derivative fabrics for discharge printing. It has been found that this class of azo dyestuffs which will dye in deep shades can be made to discharge to a pure white, so that there can be obtained fabrics discharged to a pure white upon navy blue, black and deep brown backgrounds. Since these dyestuffs may also be used where illuminated discharges are desired, it is thus possible to obtain white or colored illuminations on dark backgrounds, and also to obtain combined white and colored pattern effects.

As has been pointed out previously, it is most desirable that the products resulting from the discharge of the azo compounds be readily removable from the fabric and preferably that they be water-soluble. Of the many substituents which impart such water-solubility to the compounds, the nuclear acidyl-amino is one of the most desirable. While the acidyl group is preferably one of a lower aliphatic acid such as acetic acid, it may be the acidyl radical of formic acid, propionic acid, butyric acid or even that of an aromatic acid such as benzoic acid. The acidyl group may further be an acidyl primary amino group or an acidyl secondary amino group as viz. acetyl-methylamino.

A wide range of components may be employed for diazotizing and coupling with the amines containing acidyl-amino groups; for example, aniline, toluidines, anisidines, phenetidines and their halogen, nitro, cyano and halogen-nitro derivatives may be employed. Especially valuable products are obtained by using as diazo components 4-nitro-aniline and its nuclear substitution products. Examples of such 4-nitro-anilines are 4-nitro-2-methoxy-aniline and 4-nitro-2-methyl-aniline.

In particular the aryl-azo anilines of the general formula

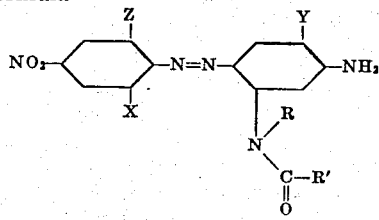

may be mentioned as being especially suitable for discharge printing wherein

X and Y are H, alkyl or alkoxy
Z is H, halogen or nitro
R is H, CH$_3$ or C$_2$H$_5$
R' is H, CH$_3$, C$_2$H$_5$, C$_3$H$_7$, or C$_6$H$_5$ These compounds are obtained by diazotizing the appropriate nitro-aniline and coupling with the appropriate m-acidyl-amino substituted aniline. When Z in the above formula is nitro, it is preferable to use zinc sulphoxylate formaldehyde as the discharging agent for white discharges.

The above monoazo compounds can be converted into valuable dischargeable disazo dyestuffs by diazotizing the primary amine group and coupling with coupling components which couple in para-position to an amino group substituted thereon. Such coupling components are amines of the following general formula:

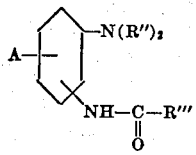

wherein
R'' is CH$_3$, C$_2$H$_5$, C$_2$H$_4$OH,

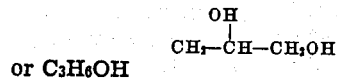

or C$_3$H$_6$OH

R''' is H, CH$_3$, C$_2$H$_5$, C$_2$H$_4$OH, or C$_3$H$_7$; and
A is a water solubilizing group selected from the group consisting of OH, O-alkylene—OH, —CN and —SO$_2$NH$_2$.

As stated, these coupling components should have the position para to the amino group open so that they may couple at that point. Preferably the acyl amino grouping in these coupling components is in the meta position to the amino group. The α-naphthylamines and their derivatives are also suitable as coupling components.

Specific examples of the class of coupling components which may be employed are N-di-hydroxy-ethyl-aniline, N-di-hydroxy-ethyl-m-toluidine, 3-acetylamino-1-di-methylamino-benzene, 3-acetylamino-1-diethylamino-benzene, 3-acetylamino-1-di-hydroxy-ethyl-amino-benzene and 5-hydroxy-β-hydroxy-ethyl α-naphthylamine. When these amines are coupled on the cellulose derivative material with the mono-azo compounds of the general formula given above, they yield desirable dark shades which are fully dischargeable both to pure white and illuminated patterns.

In accord with the procedure to be followed in forming the dyes on cellulose derivative materials, it is preferred to dye the material with the aryl-azo aniline containing an acidyl-amino group and the material thus dyed is then subjected to diazotization and coupling with the coupling component in a separate bath. The fabric should be thoroughly prescoured before dyeing. The aryl-azo compounds with which the material is to be dyed may be applied to the material in the form of aqueous dispersions. Bath methods may be employed, the materials being allowed to absorb the aryl-azo aniline component from the aqueous dispersion of the latter in which they are immersed. Again, mechanical impregnation methods may be used, the materials being impregnated with the requisite amount of the aryl-azo aniline. To this end padding or printing methods may be utilized. The mechanically impregnated material may then be aged or steamed to cause the aryl-azo aniline to enter the cellulose derivative material. The aryl-azo dyestuff is applied preferably in a bath comprising soap, soda ash and "Celascour." Celascour is a detergent comprising Turkey red oil, xylene and water. After equilibrium shade has been reached in the dyeing, the fabric is rinsed thoroughly in order to remove any extraneous nitrogenous material in order that the subsequent diazotization and coupling may be concluded satisfactorily.

The diazotization of the based fabric is now carried out and is carried out at low temperatures, preferably below 25° C. in a fairly strong diazotization bath. Sulphuric acid is preferably used in the diazotization reaction because of the very desirable thermal stability of the diazonium salt. The diazotization may be carried out on either a winch or jig or in any other suitable mechanism for coupling the material. The fabric may then be rinsed with cold water and if it is desired to facilitate the neutralization of any acid remaining on the material, there may be added to said rinsing water a small quantity of a base.

The coupling is then carried out and an excess of the coupling component over the amount theoretically necessary for the reaction may be used. While an excess is desirable to increase the speed of coupling and to minimize any decomposition of the diazonium compound, such excess is not essential. The fabric is either entered into the cold coupling bath and the temperature raised rapidly or else it is coupled in a bath which is close to the desired coupling temperature. However, it is undesirable to leave the fabric in the air while the bath temperature is being raised. Coupling may be completed in ½ to 1½ hours, being preferably carried out at elevated temperatures, the latter varying with the particular type of fabric being processed and the dyes used. The fabric is generally entered in the coupling bath at temperatures of about 50° C. and the temperature raised rapidly to the temperature at which the final coupling is to take place. For bright fabrics the temperature is raised to about 75° C. and for pigmented fabrics the temperature is raised to about 85° C. Generally it is preferable to use the maximum temperature to which the fabric can be subjected without delustering. After coupling, all the excess of the developing agent which may be left on the fabric should be removed and this removal may be effected by a vigorous basic "Gardinol" scour. It is obvious that it is necessary to have the fabric as free as possible from extraneous materials in order to facilitate the further processing of the fabric. Normally, however, the dyed fabrics which are being processed for discharge printing are scoured for about from 10 to 30 minutes in the above mentioned "Gardinol" scour. This procedure removed all the superficially held dyestuff, developer and any dispersing agent which may have adhered to the fabric. The fabric is then rinsed, dried in the usual manner and can be tendered for discharge printing.

When the fabric has been dyed, diazotized and coupled as outlined above, the washed and dried fabric is prepared for discharge printing. In lieu of printing the discharge paste may be applied by stencilling. The discharge and illuminating pastes are applied in a normal fashion with care being taken that the engravings on the rolls are of sufficient depth so that enough of the discharge paste will be applied to the fabric to give good results.

The paste comprises a metal sulfoxylate formaldehyde as reducing agent for the azo dye, an alkali metal thiocyanate as a swelling agent and a thickener, with enough water added to form a paste. A penetrant may be used when processing certain types of fabric but ordinarily its use may be dispensed with. The alkali metal thiocyanate aids in the penetration of the fabric by the reducing agent and therefore aids in the complete discharge of the dyestuff. The penetrant, where used, has a softening and solvent action on the cellulose derivative and this property also aids in the penetration of the fabric by the metal sulfoxylate formaldehyde.

We have found that the use of certain thiocyanates in conjunction with sodium sulfoxylate formaldehyde is essential in order to obtain rapid penetration and complete discharge to a pure white. Of the commercially available thiocyanates, the sodium and potassium salts are the most acceptable. The ammonium salt cannot be used where white discharges are desired since it results in tinted discharges.

In order to illuminate the discharged portion of the fabric, it is necessary to apply, simultaneously with the destruction of the ground color, a dyestuff which is either resistant to reduction and is itself a dye for the cellulose derivative, or else apply one which can be reversibly oxidized after being vatted to the leuco form.

In general it is the vat dyestuffs which are used for illumination since these dyestuffs have the desired quality of being capable of reversible oxidation after being vatted to the leuco form. The vat dyestuffs are applied to the fabric mixed in the discharge paste. By applying the illuminating dyestuff in this manner, excellent control of the pattern is achieved.

Typical paste formulas are generally as follows:

For white discharges

| | Percent |
|---|---|
| Sodium sulfoxylate formaldehyde | 15-25 |
| Sodium thiocyanate | 5-15 |
| Penetrant | 0-5 |
| Textile gum (3-5 oz. solution) | 35-50 |
| Water | 10-25 |

For making colored illuminations

| | |
|---|---|
| Suitable vat dyestuff | 5-25 |
| Sodium thiocyanate | 5-15 |
| Potassium carbonate | 2-10 |
| Sodium sulfoxylate formaldehyde | 10-20 |
| Textile gum | 20-30 |
| Water | 20-35 |

The following print pastes are representative of those used:

| Components | White | Red | Green |
|---|---|---|---|
| | Per cent | Per cent | Per cent |
| Sodium sulphoxylate formaldehyde | 16 | 9.2 | 14.7 |
| Sodium thiocyanate | 11 | 9.2 | 7.9 |
| Textile gum | 34 | 29 | 35.2 |
| Water | 34 | 29 | 32.3 |
| Glyezine A | 5 | | |
| Potash | | | |
| Indanthrene Scarlet B | | 4.6 | |
| Indanthrene Golden Yellow GK | | 19 | |
| Ponsol Flavone GC | | | 3.3 |
| Ponsol Jade Green | | | 3.3 |

The procedure followed in discharge printing will of course vary with the base color of the fabric, quality of the fabric, type of fabric, and the type of print desired. As a case in point, we find that with certain soft fabrics of the type of the loosely-woven satins, there will be a tendency for flushing along the floated warp of the material under vigorous discharging action. This flushing when due to excess reducing agent can be completely eliminated by the use of such anti-flushing agents as commercial Ludigol (sodium salt of meta-nitrobenzene-sulphonic acid), and, when due to an excess of basic substances, by suitable acidic materials such as citric acid, tartaric acid, oxalic acid and other acids which are difficultly volatile such as salicylic, benzoic, naphtholic and the sulfonic acids of benzene, phenol, naphthalene and the naphthols and which do not adversely affect the material being treated. Quantities of less than 0.5% of acid on the fabric are ample, with quantities of approximately 0.25% being usually employed. These materials are padded on the fabric prior to drying and tentering. Normally, however, flushing tendencies may be controlled by varying the composition of the discharge paste and decreasing the concentration of the sulfoxylate formaldehyde therein.

It has been found that with extremely heavy fabrics similar to a sharkskin material made from heavy denier, hard twisted, pigmented yarns, it is desirable to use penetrants. These penetrants usually are organic solvents for the organic derivatives of cellulose and in the usual practice these penetrants are added to the discharge paste. We have found, however, that more successful discharge printing and illumination can be obtained on these fabrics if the fabric is pre-padded with the penetrating agent. The heavy cellulose acetate fabric is padded by passing it through a 10-cc.-per-liter solution at 50° C. of glycerol monochlorhydrin, formal glycerol, formal glycerol monochlorhydrin, "Glyezine A" (i. e. thiodiglycol), monoacetin, or any other suitable solvents or softening agents for organic derivatives of cellulose such as diethylene glycol which are water soluble and of sufficiently high vapor pressure at room temperature so as to be non-volatile. Materials which will be removed from the fabric during the steam treatment of ageing are also preferable. This minimizes or precludes the possibility of tendering of the fabric. It has been noted that when glycerol itself is used rather than the substances noted above, tendering is often encountered.

Usually, however, a cellulose acetate fabric or a mixed fabric containing cellulose acetate and regenerated cellulose or silk yarns, can be successfully treated without resorting to the use of non-flushing agents or penetrants.

After the discharge paste has been applied to the dyed fabric either by printing or stencilling or in any other manner desired, the fabric is dried as usual to prevent marking off. As an additional precaution against marking off, Ludigol may be padded on the fabric after printing but before ageing.

The actual reduction of the ground color is now carried out by steaming in the usual continuous ager, the time varying from 5 to 20 minutes depending upon the fabric shade and the composition of the discharge paste. By this process the azoic ground color is split at the azo groups with the resultant formation of by-products which may now be washed from the material. The fabric is removed from the ager and may be placed on a winch. The time element is unimportant, however, and the fabric may be stored for an indefinite period before oxidation is carried out. The material on the winch may be circulated continuously in an overflowing vat of clear cold water. One hour is usually sufficient to remove most of the reduction products from the white discharges. When these products are removed by washing prior to oxidation, the reduced vat dyestuff may be oxidized to the desired colors by exposing the fabric to the air. Prior to removal of the products of reduction the vatted dye in the paste should be rendered insoluble. This may be done either by the vigorous and prolonged washing to remove the alkali used to solubilize the vat dye originally, by neutralization of the alkali with acid or by oxidizing the vat.

If desired, however, the fabric, instead of being washed on the winch as above described, may be processed in a commercial open soaper. This apparatus consists of a series of sprays and troughs in which the fabric may be subjected to a multiplicity of various chemicals, detergents, etc. as it passes through the various troughs and sprays.

We have found that it is possible to remove the discharge products from the white discharge and to oxidize the vatted dyestuff simultaneously by the use of low concentrations of certain oxidizing agents. If a strong oxidizing agent is used to develop the illuminating color the reduction products present in the white discharge will be affected and will be oxidized to form colored substances if such oxidizing agent is in contact with the fabric an undue length of time. If mono-amines or para phenylene diamines are present, strong oxidation will yield black compounds similar to "Aniline black." If meta-amines are present compounds similar to "Bismarck brown" will be formed. After the formation of these colored products of oxidation it is practically impossible to remove them from white discharges and the white will be off-color.

Excellent white and bright colors can be obtained in the open soaper apparatus when using a commercial 33% hydrogen peroxide, say 10 ccs. per liter, in the first few series of troughs, followed by vigorous washing by spray and immersion in cold water. It has been found also that solutions of sodium or potassium chlorate or sodium perborate, in concentrations of about 1%, are equally effective. If stronger solutions are used, the time of immersion should be shortened accordingly. Any mild oxidizing agent employed in neutral solution (i. e. in the absence of added acidic or basic constituents) which does not give colored reaction products or is itself colorless is suitable as an oxidizing agent for the vat dyestuff. These agents do not oxidize the occluded amines.

Suitable variations in the method of treating in the open soaper can be made conveniently, since it is not necessary to oxidize in the first trough. A vigorous spray of water may be utilized to wash the alkali from the fabric and precipitate the insoluble leuco vat. It is also possible to neutralize the alkali on the fabric by employing a very dilute mild acid in the first trough, removing the gum binders, excess acids and salts by subsequent spraying, and then subjecting the vat to mild oxidation. The fabric is then washed to remove any residual reduction products which may be present.

The aryl-azo anilines of the present invention have substantive affinity for cellulose esters or ethers but in general substantially no affinity for cellulose. If, therefore, such an aryl-azo aniline is applied to mixed materials containing both cellulose, e. g. regenerated cellulose or cotton, and a cellulose derivative, the latter alone takes up the aryl-azo aniline, so that on diazotizing and coupling with the coupling component the cellulose component of the material remains unchanged and uncolored. By suitably coloring the cellulose component of such mixed material with dyestuffs resisting the cellulose derivative component of the materials, solid shades or two color effects can readily be obtained according to the components of the material and the dyes selected. The dyestuff for the cellulose portion can be applied before or after the development of the azo dye on the cellulose derivative portion. If applied before development of the azo dye it may be applied either together with or separately from the aryl-azo aniline applied to the cellulose derivative portion. If the dyestuff for the cellulose component is diazotizable it can be diazotized and developed with a suitable coupling component at any convenient stage of the operation. Further, if desired, the coupling component employed in accordance with the present invention for the formation of an azo dye on the cellulose derivative component of the material may simultaneously be used to develop the diazotized dyestuff on the cellulose component of the mixed material.

The invention is applicable to the treatment of textile fabrics or other textile material made of or containing any desired organic substitution derivatives of cellulose. As examples of such derivatives there may be mentioned cellulose esters, for example cellulose acetate, propionate or butyrate, mixed esters such as the acetate-butyrate and acetate-propionate or the products obtained by treating alkalized cellulose with esterifying agents, e. g. the products known as immunized cotton obtained by treatment with p-toluene-sulpho-chloride, and cellulose ethers for example, ethyl, and benzyl cellulose, and the analogous condensation products obtainable from cellulose and glycols or other polyhydric alcohols. Mixed materials containing one or more of the aforementioned cellulose derivatives together with other textile fibers may likewise be treated in accordance with the invention. Such materials may contain, for instance, in addition to a cellulose ester or ether, cotton, wool, silk or a regenerated cellulose type of artificial silk. Such mixed materials may be colored in any manner according to the effect required and in the manner more particularly described above.

The dyeings produced on cellulose derivative materials with the aid of the aryl-azo anilines containing acidyl-amino groups in accordance with the invention, may be subsequently topped with other dyes and particularly with dyes having direct affinity for the cellulose derivative. For example, a navy blue shade may be topped with an orange dye or with both a red dye and a yellow dye in order to produce a very dark navy or a black shade. Again, a light or medium shade of blue produced in accordance with the invention may be topped to produce a wide range of dark shades such as browns, bottle greens, deep wine, and so on.

If desired, instead of applying the topping colors after the formation of the dye on the material in accordance with the invention, the said topping colors may be applied prior to the coupling operation, or together with the aryl-azo aniline. In this way some economy of time and materials may often be secured.

While the dyeings produced in accordance with the invention may be topped with other dyes for the production of compound shades, the particular merit of the dyes of the present invention is that they can be formed on cellulose derivative materials so as to produce navy blue shades of commercially desirable hue directly and without recourse to a topping operation.

As mentioned above briefly, the new dyes can also be produced in substance. In this form they can be employed for coloring cellulose ester or ether materials by direct dyeing methods though, in general, this method of coloring such materials is less advantageous than the method of forming the dyes on the fiber as described herein. When formed in substance the dyes are of particular value for coloring solutions of cellulose derivatives, especially lacquers and spinning solutions. By shaping and setting such solutions in the form of filaments, straws, films and the like, valuable colored products can be produced. For example, colored cellulose acetate filaments can be produced by dry spinning such colored solutions. The colored products so obtained by spinning methods can be topped with suitable direct dyeing dyes or mixtures of dyes in order to produce a wide range of deep shades. For this purpose it is particularly advantageous to spin filaments containing a proportion of dye such that the product is of a blue shade. A single product of this kind can, by suitable choice of topping color, be caused to yield a very large number of commercially desirable shades.

The following example sets out one process for discharge printing employing my invention, but it is not to be considered limitative.

EXAMPLE 13.8 parts of p-nitraniline are diazotized in the usual manner with sodium nitrite and hydrochloric acid and the diazo solution thus obtained is allowed to run into a solution made by dissolving 18 parts 2-amino-4-acetylamino-anisole in 10 parts of concentrated hydrochloric acid and 200 parts water and making the liquid up to 1500 parts with water. After addition of the diazo solution the liquid is stirred overnight and the product filtered off, neutralized and milled in water to a state of fine sub-division.

5 parts of a finely milled 10% aqueous paste of the 4-nitro-benzene-azo-4'-amino-3'-methoxy-6'-acetylamino benzene, obtained in the manner described above, is dispersed in 3000 parts of water with the aid of soap and Turkey red oil. 100 parts of cellulose acetate fabric is dyed in this bath at 78 to 80° C. for about 2 hours. The material is then removed from the bath, rinsed and diazotized for 30 minutes at ordinary temperature in a 30:1 bath prepared with 20 parts of concentrated hydrochloric acid and 5 parts of sodium nitrite. The diazotized material is then rinsed and entered into a 30:1 coupling bath containing 1 part of 3-acetylamino-1-dihydroxyethylamino-benzene dispersed with 10 parts of Turkey red oil and maintained at 50° C. After working for a short time the temperature is raised to 60° C. which is maintained for ½ to 1½ hours. The material is then rinsed and soaped for half an hour at 60° C. in a solution containing 0.25 gram per liter of soap. A greenish navy blue shade of excellent fastness properties is thus obtained.

A paste composed of 16 parts by weight of sodium sulfoxylate formaldehyde, 11 parts of sodium thiocyanate, 34 parts of textile gum, 34 parts of water and 5 parts of "Glyezine A" is applied to the thus dyed fabric in a predetermined pattern by passing it between printing rollers. The dried pasted fabric is now placed in the continuous ager and the ground color reduced and discharged by steaming for 5 to 30 minutes. The discharged fabric is now given a final treatment in the open soaper. A 1% solution of acetic acid is placed in the first trough of the open soaper and the fabric passed therethrough. The dilute acid both neutralizes the alkali on the material and the fabric is then subjected to a series of vigorous water sprays in which the gum, salts and excess acid solution are removed. The last traces of the amines formed by the reduction of the azo dye are then completely removed by additionally washing the fabric with clear, cold water for 2 to 10 minutes. The fabric may also be washed in a rope washer with cold water from 30 to 45 minutes in lieu of processing in an open soaper. The fabric is then dried normally, finishing oils are applied and then calendered to give a desirable hand.

It is to be understood that the foregoing detailed description is given merely by way of illustration and that many variations may be made therein without departing from the spirit of our invention.

Having described our invention, what we desire to secure by Letters Patent is:

1. Process for the discharge printing of an organic derivative of cellulose material colored by coupling on said material an azo dyestuff whose formula is

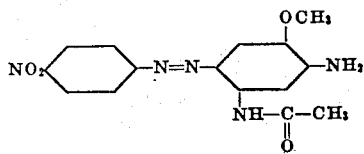

with an amine of the following formula

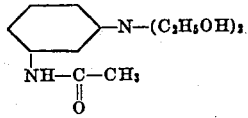

which comprises discharging the resulting polyazo dyestuff in a predetermined pattern with a discharge paste comprising an alkali metal thiocyanate, a metal sulfoxylate formaldehyde and a vat dyestuff for illumination of the discharged portion of the fabric.

2. Process for the discharge printing of cellulose acetate material colored by coupling on said material an azo dyestuff whose formula is

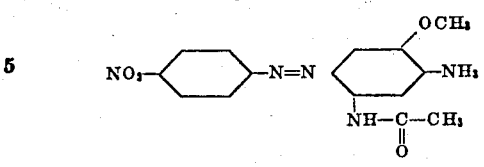

with an amine of the following formula

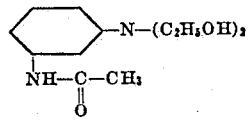

which comprises discharging the resulting polyazo dyestuff in a predetermined pattern with a discharge paste comprising an alkali metal thiocyanate, a metal sulfoxylate formaldehyde and a vat dyestuff for illumination of the discharged portion of the fabric.

GEORGE W. SEYMOUR.
VICTOR S. SALVIN.
GEORGE C. WARD.